F. E. A. Engelmann,
Corn Planter.
No. 91,002.   Patented June 8, 1869.
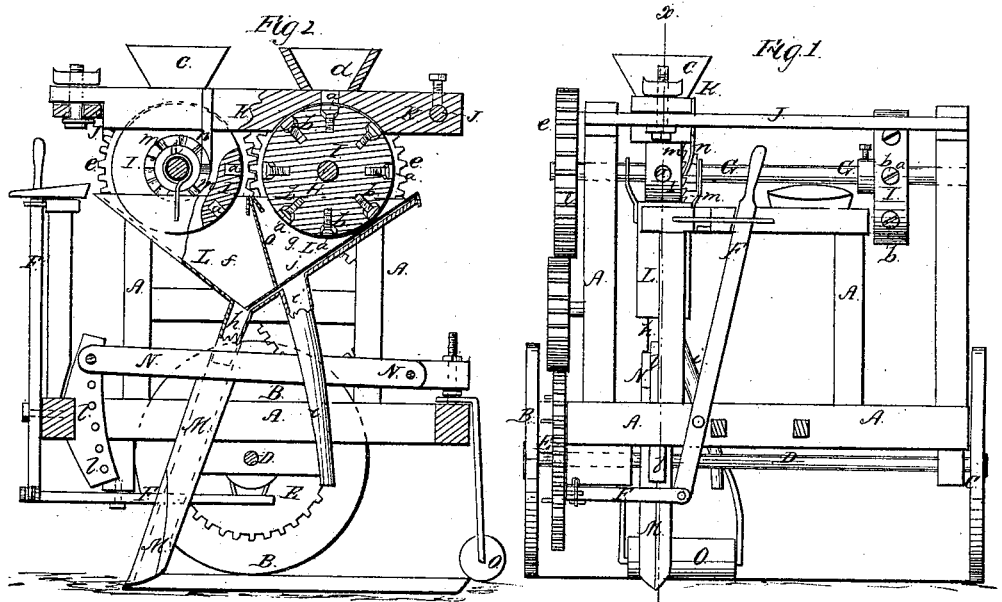
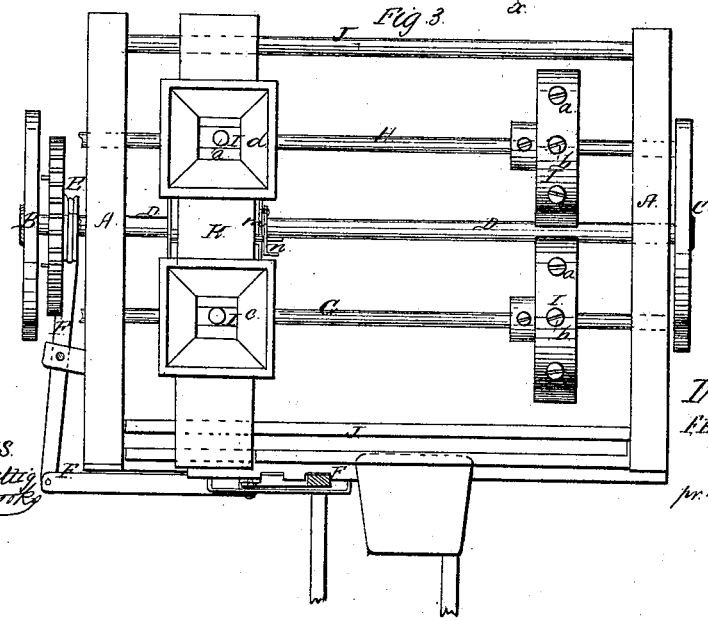

United States Patent Office.

FRIEDRICK E. A. ENGELMAN, OF CHEEKTOWAGA, NEW YORK.

Letters Patent No. 91,002, dated June 8, 1869.

IMPROVEMENT IN SEED-PLANTER.

The Schedule referred to in these Letters Patent and making part of the same.

*To all whom it may concern:*

Be it known that I, FRIEDRICK E. A. ENGELMAN, of Cheektowaga, in the county of Erie, and State of New York, have invented a new and improved Seed-Planter; and I do hereby declare that the following is a full, clear, and exact description thereof, which will enable others skilled in the art to make and use the same, reference being had to the accompanying drawings, forming part of this specification, in which—

Figure 1 represents a front elevation of my improved seed-planter.

Figure 2 is a vertical longitudinal section of the same, taken on the plane of the line $x\,x$ of fig. 1.

Figure 3 is a plan or top view of the same.

Similar letters of reference indicate corresponding parts.

This invention relates to a new machine for planting seed to any suitable depth, and in rows of suitable width, with or without fertilizing-matter; and The invention consists in the general arrangement of parts, whereby the desired result is obtained.

A, in the drawing, represents the frame of my improved corn-planter. It is supported on two wheels, B C, which are arranged on the same axle, D.

The wheel B is mounted on the axle, and C is loose on the same, so that the axle will be revolved by the motion of the wheel B.

On the axle D is arranged a loose toothed wheel, E, which can, by means of a lever, F, be thrown in gear with the wheel B whenever it is desired to have the seeding-apparatus in motion. In figs. 1 and 3 it is shown to be out of gear.

G and H are two horizontal transverse shafts, hung in bearings on the upper part of the frame A. They carry seed-disks, I I, which have indentations, or depressions, $a$, formed in their edges, for the reception of the seed.

The size of the depressions $a$ can be regulated, as their bottoms are the heads of screws, $b\,b$, which can be set higher or lower, as may be desired, and as indicated in section in fig. 2.

The two or more sets of disks are adjustable on the shafts G H, to be any distance apart, for the purpose of planting in rows of suitable width.

For each set of disks on the shafts G H is arranged, on stationary transverse bars J J, a sliding frame, K, which contains two hoppers, $c$ and $d$, one above each disk, as shown.

The shafts G H have toothed wheels, $e\,e$, that are, by means of an intermediate pinion, or directly, connected with the wheel E. When the same is in gear, the shafts G H will be revolved, and with them the disks I I, which, being under the hoppers $c\,d$, receive seed and fertilizing-substance in their cups $a$.

From the frame A, or from the shafts G H, is suspended a large trough, or vessel, L, under each set of disks I, as shown in fig. 2. Into this vessel are discharged the contents of the cups $a$.

A partition, $o$, divides the vessel into two chambers, $f$ and $g$.

The chamber $f$ receives the seed from the disk I, of the shaft G, while the chamber $g$ receives manure from the disk I of the shaft H.

The seed is, from $f$, carried, by a tube $h$, to the ground, said tube entering the hollow shovel-standard, M, as usual.

The fertilizing-matter is, from the chamber $g$, discharged through a tube, $i$.

When seed alone is to be dropped, the hopper $d$ is left empty, or the mouth of the tube $i$ is closed, by a slide, $j$, as indicated by fig. 2.

The shovel can be adjusted up and down, to any desired depth of furrow, by being attached to a pivoted lever, N, which can be set on a perforated, or notched plate, $l$, to any desired position.

The furrow made by the shovel is covered by a roller, O, which is attached to the rear part of the frame A.

Ratchet-teeth, $m\,m$, may be arranged on the disks I, and springs, $n$, on the frames K, to prevent the apparatus from operating during backward motion.

Having thus described my invention,

I claim as new, and desire to secure by Letters Patent—

The general combination, with each other, of the revolving droppers I I, having the adjustable cups $a$, of the laterally-adjustable hopper-frame K, and drop-box L, and of the up-and-down adjustable hollow shovel-standard, all arranged and operating substantially as herein shown and described.

FRIEDRICK E. A. ENGELMAN.

Witnesses:
GEORG HILDENBRAND,
REINHARD THAUER.